US006708887B1

(12) United States Patent
Garrett et al.

(10) Patent No.: US 6,708,887 B1
(45) Date of Patent: Mar. 23, 2004

(54) DETACHABLE HAND-HELD COMPUTER HANDLE

(75) Inventors: Stephen A. Garrett, Vancouver, WA (US); Mark B. Smith, Vancouver, WA (US); Shelton Louie, Vancouver, WA (US)

(73) Assignee: GSL Solutions, Inc., Vancouver, WA (US)

( * ) Notice: Subject to any disclaimer, the term of this patent is extended or adjusted under 35 U.S.C. 154(b) by 0 days.

(21) Appl. No.: 09/932,657

(22) Filed: Aug. 18, 2001

(51) Int. Cl.$^7$ ................................................ G06K 7/10
(52) U.S. Cl. ............................ 235/462.45; 235/472.01
(58) Field of Search ................................. 235/472, 462, 235/463; 361/683, 729, 731; 395/893

(56) References Cited

U.S. PATENT DOCUMENTS

| | | | | |
|---|---|---|---|---|
| 5,323,195 A | * | 6/1994 | Phillips | 396/422 |
| 5,349,497 A | * | 9/1994 | Hanson et al. | 361/683 |
| 5,410,141 A | * | 4/1995 | Koenck et al. | 235/472.02 |
| 5,636,409 A | * | 6/1997 | Akins | 16/422 |
| 5,664,231 A | * | 9/1997 | Postman et al. | 106/14.21 |
| 5,801,918 A | * | 9/1998 | Ahearn et al. | 235/472.01 |
| 6,109,528 A | * | 8/2000 | Kunert et al. | 235/462.45 |
| 6,184,804 B1 | * | 2/2001 | Harrison | 341/22 |

* cited by examiner

Primary Examiner—Karl D. Frech
Assistant Examiner—Edwyn Labaze
(74) Attorney, Agent, or Firm—Ipsolon LLP.

(57) ABSTRACT

A portable, hand-held computer handle that may be detachable secured to a conventional hand-held computer such as a personal digital assistant or the like. The handle preferably includes a substantially planar hand-held computer-mounting portion with an ergonomically-shaped joystick-style handle portion extending orthogonally therefrom. The handle portion includes a trigger in electrical communication with the hand-held computer such that one or more functions of the hand-held computer can be controlled by actuation of the trigger. In a preferred embodiment, the hand-held computer includes a conventional scanner or other data reader thereon, and the trigger on the handle portion activates the scanner. Preferably, the handle portion is aligned with the center of gravity of the handle and hand-held computer. More preferably, the forward and backward and side-to-side position and angle of the handle portion with respect to the computer-mounting portion is adjustable thereby allowing a user to individually adjust the position of the handle to their particular needs. In a preferred embodiment, the handle is sized to receive a conventional off-the-shelf hand-held computer, and it includes conventional connectivity jacks in electrical communication with the hand-held computer to facilitate charging of the hand-held computer and/or data transmittal and exchange between the hand-held computer and another computer system.

39 Claims, 2 Drawing Sheets

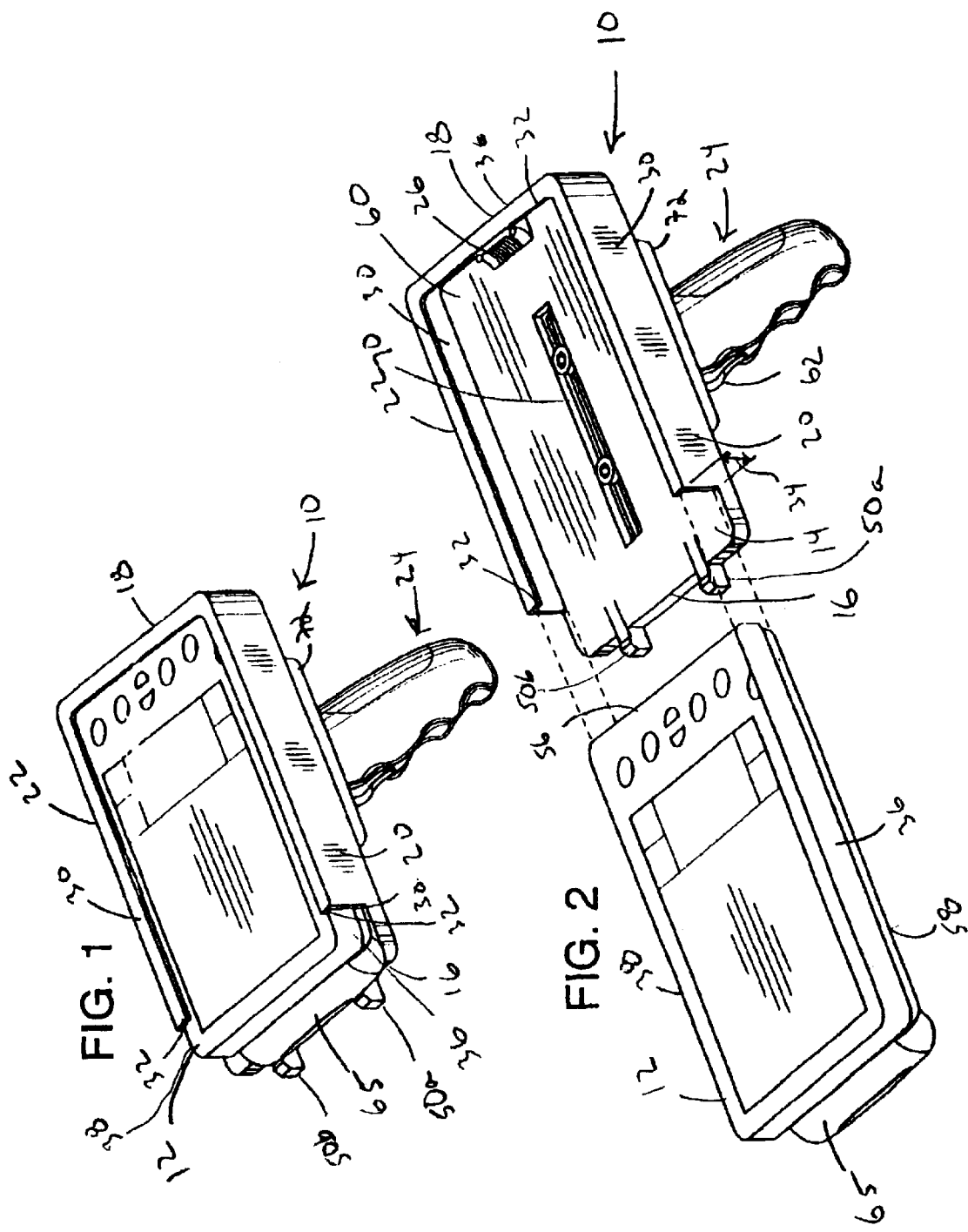

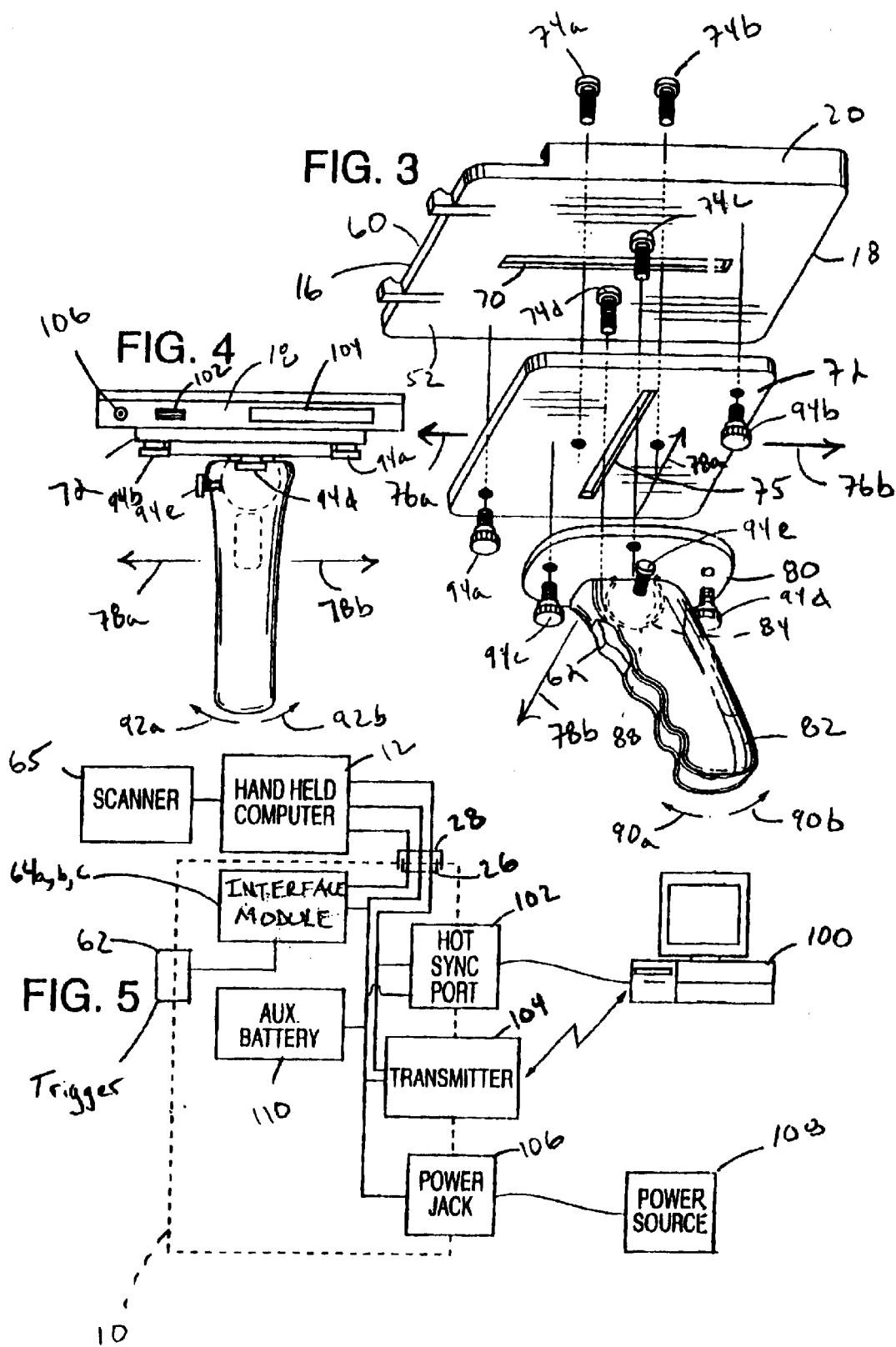

DETACHABLE HAND-HELD COMPUTER HANDLE

TECHNICAL FIELD

This invention relates to a detachable handle that facilitates use of a conventional hand-held computer such as a Personal Digital Assistant ("PDA") or the like, and more particularly, to a cradle for operably receiving the hand-held computer having a joystick-type handle extending therefrom with a trigger to allow easy actuation of one or more functions on the hand-held computer.

BACKGROUND OF THE INVENTION

Portable data entry devices are widely used in a variety of applications. For example, in a retail store, such as a grocery store or pharmacy, employees regularly use such devices to track inventory and validate or change prices. In particular, the employee usually travels throughout the store holding a portable bar-code scanning device or the like, and he or she operates the device to read codes on each product in the store. The information collected by the device is usually transmitted to a main computer for further processing. Depending on the particular task to be accomplished, the employees frequently hold and operate the device for hours.

Known portable bar-code scanners, commonly referred to in the industry as "bricks on a stick", are expensive, large, relatively heavy devices that usually include a frame having a protruding handle with a trigger. The user operates these types of devices by holding it close to a product to be scanned, and depressing the trigger. However, the size and weight of these types of devices make them difficult to use for extended periods of time. Moreover, because of their weight, they tend to be dropped relatively frequently, leading to premature breakage of the devices. In cases, were the device breaks, whether it be the handle or the related computing electronics, the entire unit must be replaced or serviced, thereby increasing the expense of owning and using these types of devices.

More recently, some manufacturers of hand-held retail sales scanners have attempted to improve the ergonomic aspects of their scanners. For example, Symbol Corporation of San Jose, Calif. sells a variety of hand-held scanners designed to be held in the palm of the user's hand. These designs include a substantially planar scanner having recesses for receiving the user's fingers, and more ergonomically trigger actuated handles extending from the scanner. While these improved devices are lighter and easier to hold than their predecessors, they are still expensive, and they still require the entire unit to be replaced or serviced if an individual component becomes inoperative.

Recent advances in computer manufacturing have allowed a great deal of portable computing power to be placed into a relative compact, light weight, and economical hand-held unit. These hand-held computers include devices are commonly known by a variety of names including Personal Digital Assistants ("PDA's") (e.g., Palm Pilot, Visor, Jordana, and the like) and pocket PC's. They perform a variety of functions, including computing, database management and storage, communication, and the like.

The popularity of these types of hand-held computers is increasing as the extent of their available applications increases. Several manufacturers of hand-held computers offer bar-code scanning devices that can either be detachably secured to the hand-held computer or are integral with the hand-held computer. However, information is typically entered into these types of hand-held computers through a keyboard or touch screen positioned on an upper surface of the device. This form of data entry requires a user to hold the computer while also entering the information. Accordingly, while these types of hand-held computers are affordable and lightweight, their known forms of data entry limit the usefulness of these types devices for some applications, such as using them as portable scanning devices as previously described.

Some inventors have had limited success with securing a miniature computer to a handle assembly. For example, in U.S. Pat. No. 5,059,778 to Zousoulas et al., a substantially planar "data module" is pivotally secured to a c-shaped "frame module," where the center of the c-shaped "frame module" defines an elongate handle having a trigger for actuating the "data module." The elongate handle is aligned to one side and generally parallel with the plane of the "data module." As a result, the weight of the "data module" is not centered on the handle. Rather, a user holding the handle continuously feels a torque on the handle that must continuously be resisted to maintain the assembly in a functional position. Over time, maintaining this continuous resistance unduly fatigues the user. Moreover, these types of devices are not well adapted to allow a conventional hand-held computer such as a palm-pilot, to be quickly and easily secured to and removed from the handle assembly.

SUMMARY OF THE INVENTION

Accordingly, despite the available improvements offered by traditional hand-held scanners, hand-held computers, and related cradles for accepting hand-held computers, there remains a need for a lightweight, economical, and well balanced joy stick-style handle assembly that may be detachably secured to a traditional hand-held computer to facilitate data entry such as scanning operations. In addition to other benefits that will become apparent in the following disclosure, the present invention fulfills these needs.

The present invention is hand-held computer handle that may be detachable secured to a conventional hand-held computer. The handle preferably includes a substantially planar hand-held computer-mounting portion with an ergonomically-shaped joystick-style handle portion extending orthogonally therefrom. The handle portion includes a trigger in electrical communication with the hand-held computer such that one or more functions of the hand-held computer can be controlled by actuation of the trigger. In a preferred embodiment, the hand-held computer includes a conventional scanner or other data reader thereon, and the trigger on the handle portion activates the scanner.

Preferably, the handle portion is aligned with the center of gravity of the handle and hand-held computer, thereby avoiding any torque created by positioning the hand-held computer off-enter on the handle. More preferably, the forward and backward and side-to-side position and angle of the handle portion with respect to the computer-mounting portion is adjustable thereby allowing a user to individually adjust the position of the handle to their particular needs.

In a preferred embodiment, the handle is sized to receive a conventional off-the-shelf hand-held computer, and it includes conventional connectivity jacks in electrical communication with the hand-held computer to facilitate charging of the hand-held computer and/or data transmittal and exchange between the hand-held computer and another computer system.

BRIEF DESCRIPTION OF THE DRAWINGS

FIG. 1 is an isometric view of a detachable hand-held computer handle having a hand-held computer operably secured thereto in accordance with a preferred embodiment of the present invention.

FIG. 2 is an isometric view of the detachable hand-held computer handle of FIG. 1, with the hand-held computer detached.

FIG. 3 is and exploded, isometric, bottom view of the detachable hand-held computer handle of FIG. 1.

FIG. 4 is a rear view of the detachable hand-held computer handle of FIG. 2.

FIG. 5 is a schematic diagram of the electrical features of the hand-held computer handle of FIG. 1.

DETAILED DESCRIPTION

A hand-held computer handle 10 that may be detachably secured to a conventional hand-held computer 12 is disclosed in FIGS. 1–5.

The computer handle 10 preferably includes a substantially planar hand-held computer-mounting portion 14 having front, back, left and right sides 16, 18, 20, 22 with an ergonomically shaped joystick-style handle portion 24 extending generally orthogonally therefrom. The computer-mounting portion 14 includes an electrical connector 26 for operably engaging a mating electrical connector 28 on the hand-held computer 12. The hand-held computer 12 is operably and detachably connected to the computer handle 10 such that the hand-held computer 12 engages the electrical connector 26 on the computer handle 10.

As best shown in FIG. 2, one known device for establishing such a connection is securing a sleeve 30 having an upper lip 32 on a portion of the left, right and back sides 20, 22, 18, respectively, of the computer-mounting portion 14. The height 34 of the upper lip 32 is sized to slidably receive the respective sides 36, 38 of the hand-held computer 12. One or more locking hooks 50a, 50b are secured to the front side of the mounting surface. Preferably, the locking hooks 50a, 50b are biased to an engaged position shown in FIG. 1. More preferably, the locking hooks 50a, 50b are beam springs secured to the bottom 52 of the computer-mounting portion 14 as best shown in FIG. 3.

To detachably secure the hand-held computer 12 to the computer handle 10, a user deflects the locking hooks 50a, 50b downward by inserting the leading edge 56 of the hand-held computer 12 into the sleeve 30 as shown in FIG. 2, thereby allowing the back surface 58 of the hand-held computer 12 to be slid along the upper surface 60 of the computer-mounting portion 14 through the sleeve 30 on the left and right sides 20, 22 of the computer-mounting portion 14. When the hand-held computer 12 operably engages the electrical connector 26, the hooks 50a, 50b return to their engaged position, thereby securing the hand-held computer 12 to the computer handle 10.

As best shown in FIGS. 1 and 5, the handle portion 24 includes a trigger 62 in electrical communication with the hand-held computer 12, preferably through the electrical connector 26, such that one or more functions of the hand-held computer 12 can be controlled by actuation of the trigger 62. This trigger actuation of one or more functions on the hand-held computer can be accomplished in a variety of different ways depending on the remote interface functionality of the particular hand-held computer 12. For example, some hand-held computer interfaces allow for connection of an external keyboard to the hand-held computer. Accordingly, the trigger actuation can emulate keyboard commands to actuate a desired function. The trigger assembly can send a switch closure signal to an interface module 64a contained within the computer handle 10. In response to detecting the switch closure signal, the interface module 64a sends the desirable predefined programmable keycode sequence to the hand-held computer 12. The hand-held computer 12 receives this keycode sequence from the interface module 64a and then executes the commanded function.

Alternatively, some hand-held computers have an interface, which is commonly referred to as a "hotsync" interface, which allow for connection of an external switch so as to effect an electronic signal on the hand-held computer. In this application, the switch can be the trigger 62 and it can be operably connected to the hotsync interface on the hand-held computer through an interface module 64b such that activation of the trigger 62 commands a desirable function on the hand-held computer 12.

Similarly, some hand-held computers allow remote actuation through a serial interface. Such interfaces are specifically designed to operably connect the hand-held computer 12 to an external computing device or the like. In such applications, the trigger 62 sends a switch closure signal to an interface module 64c contained within the computer handle 10. The interface module 64c then sends a programmable serial data sequence to the hand-held computer 12 so a to notify the desired hand-held computer 12 application to be commanded that a command switch has been closed. The computer application includes internal logic to detect the switch closure command and initiate a predetermined command associated with that switch closure.

Preferably, the hand-held computer 12 includes a conventional barcode scanner 65 or other data reading device thereon, and the trigger 62 on the handle portion 24 activates the reading device to allow remote scanning of items. A variety of hand-held computers having either a self-contained scanning element or a scanner that is detachably secured to the hand held-computer. For example, the Symbol Corporation of San Jose, Calif. sells a bar code scanner under the trademark CSM 150 that may be detachably secured to a hand-held computer sold by Handspring, Inc. of Mountain View, Calif. under the trademark VISOR. Similarly, the Inside Technologies Company located near Aix-en-Provence in the South of France manufactures a portable radio-frequency identification ("RFID") tag reader under the trademark HAND IT that may be detachably secured to a VISOR hand-held computer.

Preferably and as best shown in FIG. 1, the handle portion 24 is contoured so that it may be comfortably grasped by a user, and it is aligned with the center of gravity of the computer handle 10 and hand-held computer 12. Accordingly, any torque created by positioning the hand-held computer 12 off-center on the computer handle 10 is avoided.

More preferably, the forward and backward and side-to-side position and angle of the handle portion 24 with respect to the computer-mounting portion 14 is adjustable thereby allowing a user to individually adjust the position of the handle portion 24 to their particular needs. One known way to provide this range of movement for the handle portion 24 is shown in FIG. 3. For example, the hand-held computer-mounting portion 14 includes an elongate slot 70, preferably aligned along the longitudinal centerline of the computer-mounting portion 14. A substantially planar plate 72 is aligned generally parallel to the computer-mounting portion 14 and is slidably secured to the computer-mounting portion 14 at elongate slot 70, preferably with bolts 74a, 74b, so that plate 72 may move forward-and backwards in the direction of arrows 76a, 76b along elongate slot 70.

The substantially planar plate 72 includes a second slot 75 aligned orthogonally to elongate slot 70 in the computer-mounting portion 14. The handle portion 24 is slidably secured to the plate 72 at the second slot 75, preferably with bolts 74c, 74d, so that the handle portion 24 may move side-to-side in the direction of arrows 78a, 78b. Accordingly, the handle portion may be moved forward and backward in the direction of arrows 76a, 76b and side-to-side in the direction of arrows 78a, 78b with respect to the computer-mounting portion 14.

Preferably, the handle portion 24 includes handle-mounting portion 80 and a handle grip portion 82, and a ball 84 and socket 88 operably secure these portions 80, 82 together. One known operational arrangement is shown in FIG. 3. In this embodiment, the handle grip portion 82 includes a socket 88 for operably receiving a ball 84 extending from the handle-mounting portion 80. Accordingly, the handle grip portion 82 may be tilted about the ball socket forward and backward in the direction of arrows 90a, 90b, and side-to-side in the direction of arrows 92a, 92b. As a result, the tilt of the handle grip may be positioned in an infinite number of positions about the ball 84 and socket 88.

After a user positions the handle grip portion 82, handle-mounting portion 80, and the substantially planar plate 72 at desirable positions with respect to the hand-held computer-mounting portion 14, these components are preferably detachably secured in place. One known device for securing these components together includes extending tensioning bolts 94a–e from these components to frictionally engage their adjacent component. For example, bolts 94a, 94b extending from the substantially planar plate 72 may be tightened to frictionally engage the lower surface of the hand-held computer-mounting portion 14, thereby holding the substantially planar plate 72 in place with respect to the hand-held computer-mounting portion 14. Similarly, bolts 94c, 94d extending from the handle-mounting portion 80 may be tightened to frictionally engage the lower surface of the substantially planar plate 72, thereby holding the handle-mounting portion 80 in place with respect to the substantially planar plate 72. Also, at least one bolt 94e extending from the socket end of the handle grip portion 82 to the ball 84 on the handle-mounting portion 80 maybe tightened to frictionally engage the ball 84, thereby holding the handle grip portion 82 at a desired angle with respect to the handle-mounting portion 80.

It can be appreciated that these bolts 94a–e may be individual or collectively loosened and tightened as needed by a user to adjust individual positions of these components, thereby optimizing the location of a handle grip portion 82 for a particular user. Preferably, the handle grip portion 82 is aligned substantially with the center of gravity of the computer handle 10 with a hand-held computer 12 installed, thereby avoiding any torque created by positioning the hand-held computer 12 off-center on the computer handle 10. In addition, the ball 84 and socket 88 on the handle portion 24 allow the handle grip portion 82 to rotate about the ball 84, thereby allowing the handle grip portion 82 to be easily rotated to accommodate either left or right handed users.

Another possible orientation of these components includes moving the handle portion 24 toward the front side 16 of the hand-held computer-mounting portion 14, such that the aft end of the computer-mounting portion 14 rests on the user's wrist and forearm. Accordingly, the torque generated by the center of gravity of computer handle 10 and hand-held computer 12 combination rests on the user's forearm, thereby improving the user's long-term ability to hold the computer handle 10 with a hand-held computer 12 attached.

In a preferred embodiment, the computer handle 10 is sized to receive a conventional off-the-shelf hand-held computer 12. In addition to other benefits, the computer handle 10 serves to further protect the off-the-shelf hand-held computer against impacts associated with inadvertent dropping of the computer handle 10 with the hand-held computer 12 installed.

The computer handle 10 may also include conventional connectivity jacks or ports in electrical communication with the hand-held computer to facilitate charging of the hand-held computer and/or data transmittal and exchange between the hand-held computer and another computer system. A possible electrical configuration of the computer handle 10 is shown schematically in FIG. 5.

In the displayed configuration of FIG. 5, the trigger communicates with the interface module 64a, 64b, 64c, which communicates with the hand-held computer 12 to actuate a desired function, such as actuating a data reader as previously described. The hand-held computer 12 can communicate with an external computing system 100 through a variety of known technologies including a conventional input/output port, which is also known as a "hotsync" port 102, or a wireless transmitter 104. Known wireless transmission technologies include infrared, radio frequency, and bluetooth technologies.

Preferably, an electrical jack 106 on the handle is in electrical communication with the hand-held computer 12 and it allows an external power source 108 to be connected to the electrical jack 106 to power and/or charge the hand-held computer 12. More preferably, the computer handle 10 includes an internal battery 110, which is also charged by the external power source 108, and provides additional charging and/or electrical power to the hand-held computer 12. The internal battery 110 or the battery in the hand-held computer 12 are in electrical communication with the interface module 64a, 64b, 64c, "hotsync" port 102, and transmitter 104 as required to supply power to these components.

ALTERNATIVE EMBODIMENTS

Having here described preferred embodiments of the present invention, it is anticipated that other modifications may be made thereto within the scope of the invention by individuals skilled in the art. Thus, although preferred, more preferred, and alternative embodiments of the present invention have been described, it will be appreciated that the spirit and scope of the invention is not limited to those embodiments, but extend to the various modifications and equivalents as defined in the appended claims.

What is claimed is:

1. A portable computer handle for detachably receiving a hand-held computer, the computer capable of performing at least one function, said portable computer handle comprising:

a computer-mounting portion for detachably receiving the hand-held computer;

a sliding member slidably secured to said computer-mounting portion such that said sliding member moves relative to said computer-mounting portion along a defined first direction;

an elongate handle slidably secured to said sliding member such that said elongate handle moves relative to said sliding member, independent of movement of said computer-mounting portion in said defined first direction, along a defined second direction, said second direction substantially orthogonal to said first direction, said elongate handle extending substantially orthogonally from said computer-mounting portion; and, a trigger operably secured to said elongate handle in electrical communication with the portable computer such that depressing the trigger actuates the at least one function on the hand-held computer.

2. The portable computer handle for detachably receiving a hand-held computer of claim 1, wherein said elongate handle is a joystick-type handle.

3. The portable computer handle for detachably receiving a hand-held computer of claim 2, wherein said joystick-type handle includes a handle grip portion.

4. The portable computer handle for detachably receiving a hand-held computer of claim 1, wherein said hand-held computer is operably secured to a data reader, and said at least one function includes operating the data reader.

5. The portable computer handle for detachably receiving a hand-held computer of claim 4, wherein the data reader is a bar code scanner.

6. The portable computer handle of claim 1, further includes a radio frequency identification tag reader operably secured to the computer.

7. The portable computer handle for detachably receiving a hand-held computer of claim 1, wherein said hand-held computer is a personal digital assistant.

8. The portable computer handle for detachably receiving a hand-held computer of claim 7, wherein said personal digital assistant is an off-the-shelf product.

9. The portable computer handle for detachably receiving a hand-held computer of claim 1, wherein said elongate handle is positioned below said hand-held computer and aligned substantially with the center of gravity of the combined portable computer handle and hand-held computer.

10. The portable computer handle for detachably receiving a hand-held computer of claim 1, wherein said first and second directions are perpendicular to each other and aligned substantially in a plane.

11. The portable computer handle for detachably receiving a hand-held computer of claim 10, where said first direction is toward and away from a front side of said substantially planar mounting portion.

12. The portable computer handle for detachably receiving a hand-held computer of claim 1, wherein the position of said elongate handle with respect to said substantially planar mounting portion is adjustable in both said first direction and said second direction.

13. The portable computer handle for detachably receiving a hand-held computer of claim 12, wherein said first direction is toward and way from a front side of said mounting portion, and said second direction is toward and away from a right side of said mounting portion.

14. The portable computer handle for detachably receiving a hand-held computer of claim 1, wherein said elongate handle is rotatably secured to said substantially planar member.

15. The portable computer handle for detachably receiving a hand-held computer of claim 1, wherein said elongate handle is operably secured to said substantially planar member such that the angle of said elongate handle with respect to said substantially planar member is adjustable.

16. The portable computer handle for detachably receiving a hand-held computer of claim 15, wherein a ball and socket joint operably secures said elongate handle to said substantially planar member.

17. The portable computer handle of claim 1, further including at least auxiliary connectivity port operably secured to said portable computer handle and in electrical communication with the hand-held computer.

18. The portable computer handle of claim 17, wherein said auxiliary connectivity port is an electrical jack for operably engaging an external power source to power the hand-held computer.

19. The portable computer handle of claim 17, wherein said auxiliary connectivity port is a communications port for operably connecting an external computer system to the hand-held computer.

20. The portable computer handle of claim 1, further including an internal battery received with said portable computer handle, said internal battery in electrical communication with said hand-held computer to provide auxiliary power to said hand-held computer.

21. A portable computer handle for detachably receiving a hand-held computer, the computer capable of performing at least one function, said portable computer handle comprising:

a base for detachably receiving the hand-held computer;

a sliding member slidably secured to said base such that said sliding member moves relative to said base along a defined first direction;

an elongate handle having a base mounting portion and a handle grip portion, said base mounting portion slidably secured to said sliding member such that said elongate handle moves relative to said sliding member along a defined second direction, said defined second direction being substantially orthogonal to said defined first direction, wherein said handle grip portion infinitely adjustable in at least two directions with respect to said base; and, a trigger operably secured to said handle grip portion and in electrical communication with the hand-held computer such that depressing the trigger actuates the at least one function on the hand-held computer.

22. The portable computer handle for detachably receiving a hand-held computer of claim 21, wherein said hand-held computer is operably secured to a data reader, and said at least one function includes operating the data reader.

23. The portable computer handle for detachably receiving a hand-held computer of claim 22, wherein the data reader is a bar code scanner.

24. The portable computer handle for detachably receiving a hand-held computer of claim 22, wherein the data reader is a radio frequency identification tag reader.

25. The portable computer handle for detachably receiving a hand-held computer of claim 21, where said first direction is toward and away from a front side of said base.

26. The portable computer handle for detachably receiving a hand-held computer of claim 21, further including detachable fasteners for operably holding said sliding member and said elongate handle in place.

27. The portable computer handle for detachably receiving a hand-held computer of claim 26, wherein said first direction is toward and way from a front side of said base, and said second direction is toward and away from a right side of said base.

28. The portable computer handle for detachably receiving a hand-held computer of claim 21, wherein said handle grip is rotatably secured to said base.

29. The portable computer handle for detachably receiving a hand-held computer of claim 21, wherein said handle grip portion is operably secured to said base mounting portion such that the angle of said elongate handle grip portion with respect to said base mounting portion is adjustable.

30. The portable computer handle for detachably receiving a hand-held computer of claim 29, wherein a ball and socket joint operably secures said handle grip portion to said base mounting portion.

31. A portable scanning device comprising:

a scanning element;

a general purpose, portable hand-held computer operably secured to the scanning element and defining a general plane, said portable hand-held computer having a plurality of off-the-shelf applications therein, one application of said plurality of applications therein including operating the scanning element in response to an input device operably connected to the hand-held computer; and, an elongate handle detachably secured to the portable hand-held computer and extending substantially orthogonally from said plane, said elongate handle having a trigger operably secured thereto, said trigger in communication with the input device such that actuating the trigger commands the input device to operate the scanning element, said handle independently moveable in a first direction and a second direction along the general plane, said first direction being substantially orthogonal from said second direction.

32. The portable scanning device of claim 31, further including a base for detachably securing the portable hand-held computer to said handle, and said handle is slidably secured to said base.

33. The portable scanning device of claim 32, wherein said elongate handle is a joystick-type handle.

34. The portable scanning device of claim 33, wherein said joystick-type handle includes a handle grip portion.

35. The portable scanning device of claim 31, wherein said scanning element is a bar code scanner.

36. The portable scanning device of claim 31, wherein said scanning element is a radio-frequency identification tag reader.

37. The portable scanning device of claim 31, wherein said handle is positioned below said hand-held computer and aligned substantially with the center of gravity of the combined handle and hand-held computer.

38. The portable scanning device of claim 31, further including a base for detachably securing the portable hand-held computer to said handle, and said handle is slidably secured to said base.

39. The portable scanning device of claim 38, wherein said elongate handle is rotatably secured to said base.

* * * * *